Dec. 21, 1943. C. P. BAKER 2,337,519
METHOD AND APPARATUS FOR HANDLING THERMOPHORE MIXTURES
Filed Aug. 20, 1941
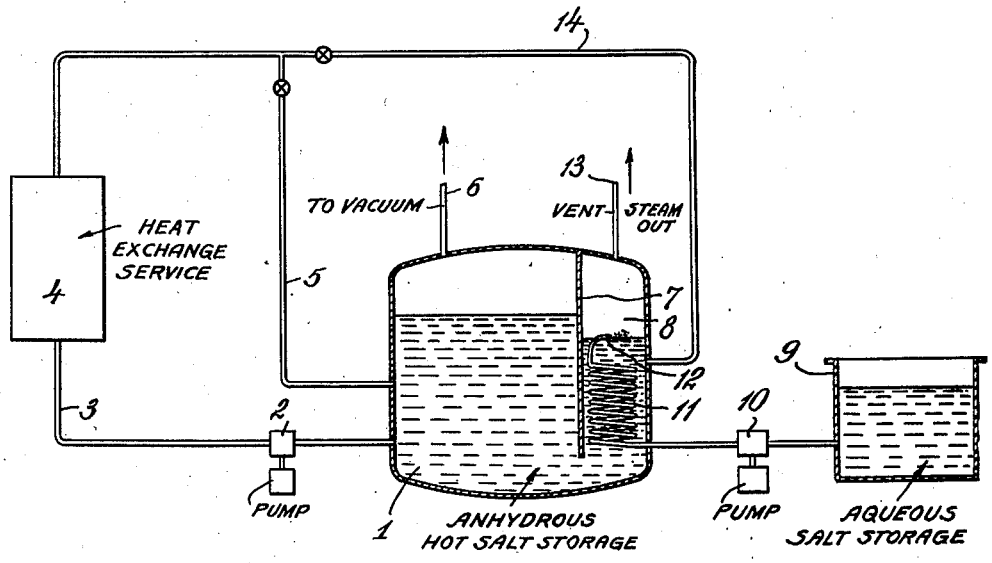
INVENTOR
Charles P. Baker
BY Oswald G. Hayes
ATTORNEY Patented Dec. 21, 1943

2,337,519

UNITED STATES PATENT OFFICE 2,337,519

METHOD AND APPARATUS FOR HANDLING THERMOPHORE MIXTURES

Charles P. Baker, Beaumont, Tex., assignor to Socony-Vacuum Oil Company, Incorporated, New York, N. Y., a corporation of New York Application August 20, 1941, Serial No. 407,616

3 Claims. (Cl. 159—1)

This invention has to do with the handling of fused inorganic salt mixtures, utilized as circulating fluid heat transfer media in high temperature processes.

Many processes have use for fluid heat transfer media relatively stable at temperatures of 800° F. to 1000° F., and above, at which the organic heat transfer media used at lower temperatures cannot be used. In many such processes mixtures of fused inorganic salts are used. Various mixtures of chlorides of metals and of alkali metals are so useful, and one mixture of this general kind which has gone into relatively wide use is a mixture of alkali metal salts of oxygen acids of nitrogen. One such mixture is that consisting of 53% of potassium nitrate, 7% of sodium nitrate, and 40% of sodium nitrite. Such mixtures undergo changes as a result of this service and frequently require reconditioning. For example, the alkali nitrate-nitrite mixture above undergoes oxidation decreasing the nitrite/nitrate ratio, and carbonation from exposure to carbon dioxide containing atmospheres. Both changes result in serious increases in the melting point of the salt mixture. The reconditioning methods frequently end with the reconditioned salt in the form of a concentrated aqueous solution.

Upon return of the reconditioned salt to the system, the removal of water is necessary for several reasons. First, the circulating heat transfer medium is usually at such temperatures that introduction of the aqueous material directly thereinto with attendant sudden vaporization of water, is dangerous. Secondly, and particularly with mixtures in which halides are present, the presence of even a trace of water gives highly corrosive thermophore media. In other systems, even when water vapor would not present a corrosion problem, vacuum is utilized for various purposes in the circulating system and the presence of water vapor deranges the operation. The external concentration of the material to an anhydrous condition would appear to be indicated, but this also is surrounded with difficulties, some operative and some economic. For example, in the above alkali nitrate-nitrite mixture, an aqueous mix containing 25 pounds of water per hundred pounds of salt melts at about 125° F. and boils at about 270° F., while one containing 1½ pounds of water per hundred pounds of salt, (which is an acceptable concentration for introduction to a working salt bath held at temperatures above 800° F.), boils at about 450° F.

Consequently this invention has for its principal object the provisions of method and means whereby reconditioned salt in the form of aqueous mixes may be directly returned to a working salt bath system held at high temperatures without introducing undue amounts of water vapor into such a system. Other objects will appear hereinafter.

In order to understand this invention, reference is made to the drawing attached hereto, the single figure of which shows, in diagram form, apparatus suitable for the practice of this invention.

In this drawing the circulation system in which the anhydrous molten salt is utilized is indicated by a storage vessel 1, from which salt is withdrawn by pump 2 and passed through pipe 3 and whatever heat exchange service is exacted of it, as indicated at 4, and returned to storage by pipe 5. A vacuum may be held upon all or upon a portion of this system, and for present purposes is indicated by pipe 6. Within the storage vessel 1 is an interior partition 7, serving to isolate a vapor space 8 from the remainder of the chamber while the molten salt within this partition, below 8 is in open communication with the remainder of the salt in 1 below the bottom edge of partition 7. In the usual operation, the molten salt in vessel 1 will be at temperatures of 800° F. or more. Aqueous reconditioned salt, stored in vessel 9 is passed by pump 10 through a coil 11 positioned below the level of the hot salt within the chamber defined by partition 7 and is finally discharged through outlet 12 upon the surface of that salt below the isolated vapor space 8. This aqueous salt will be heated well above its boiling point while passing through the coil 11 and vaporization of water upon release will be relatively quiet and without excessive spatter and bumping. The vapor space 8 is open to the atmosphere through vent 13, from which the steam so released may readily escape. In case a relatively high vacuum is maintained in vessel 1 and it is desired to prevent too great disparity between the levels on either side of partition 7, an evacuating device, such as a steam jet pump, may be used on vent 13. It is frequently desirable that a small stream of hot salt from the heat exchange service, as at 14, be led to the isolated chamber defined by partition 7 to insure proper heat supply therein.

It will be evident from consideration of the above that there has been provided a method whereby relatively large amounts of aqueous reconditioned material, containing relatively large amounts of water, may be introduced directly into a system containing anhydrous material at temperatures far above the boiling point of the aqueous mixtures, without serious difficulty from troubles attendant upon ebullition, and with complete assurance of the prevention of entry of water into the main system.

As an example of operation, there may be cited one wherein, in a system containing 1,200,000 pounds of a molten alkali nitrate-nitrite mixture, at a temperature of 800° F., there were introduced, over a period of 24 hours, about 72,000 pounds of an aqueous reconditioned salt mixture containing 25 pounds of water per hundred pounds of salt, having a boiling point of about 270° F., all without ebullition troubles and without any introduction of water into the main salt circulating system.

I claim:

1. That method of directly adding aqueous mixtures of inorganic salts to a body of molten anhydrous inorganic salt maintained at a temperature substantially above the boiling point of the aqueous mixture which comprises maintaining an isolated vapor space in liquid communication with the molten anhydrous salt, passing the aqueous mixture in indirect heat exchange relationship with the molten salt in said body, discharging the aqueous mixture so heated into said vapor space, and withdrawing the vapors so formed from the said vapor space.

2. That method of directly adding aqueous mixtures of inorganic salts to a body of molten anhydrous inorganic salt maintained at a temperature substantially above the boiling point of the aqueous mixture which comprises maintaining an isolated vapor space below which there is molten salt in liquid communication with the remainder of the system in which molten salt is handled, passing the aqueous mixture in indirect heat exchange relationship with molten salt in said body, discharging the aqueous mixture so heated adjacent the surface of the molten salt below said vapor space to permit escape of water vapor into said vapor space, and withdrawing the vapors formed from said vapor space.

3. In a system comprising a closed storage vessel in which a molten anhydrous inorganic salt fluid heat exchange medium is stored, in said storage vessel a partition depending from the top thereof a substantial distance below the level of liquid maintained therein and defining a space having only liquid communication with the remainder of said vessel, a tubular coil submerged in the molten salt in said storage vessel and having an exit end adjacent the surface of the liquid in the space defined by said partition, means to introduce aqueous mixtures of inorganic salt to said tubular coil to be heated therein and to have its water content vaporized in said defined space, and means to withdraw vapor from said space.

CHARLES P. BAKER.